United States Patent
Ding et al.

(10) Patent No.: US 11,961,510 B2
(45) Date of Patent: Apr. 16, 2024

(54) INFORMATION PROCESSING APPARATUS, KEYWORD DETECTING APPARATUS, AND INFORMATION PROCESSING METHOD

(71) Applicant: KABUSHIKI KAISHA TOSHIBA, Minato-ku (JP)

(72) Inventors: Ning Ding, Yokohama (JP); Hiroshi Fujimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 122 days.

(21) Appl. No.: 16/804,388

(22) Filed: Feb. 28, 2020

(65) Prior Publication Data

US 2021/0065684 A1 Mar. 4, 2021

(30) Foreign Application Priority Data

Aug. 29, 2019 (JP) .................. 2019-157158

(51) Int. Cl.
*G10L 15/07* (2013.01)
*G10L 15/02* (2006.01)
(Continued)

(52) U.S. Cl.
CPC .............. *G10L 15/07* (2013.01); *G10L 15/02* (2013.01); *G10L 15/063* (2013.01);
(Continued)

(58) Field of Classification Search
CPC ....... G10L 15/07; G10L 15/02; G10L 15/063; G10L 15/22; G10L 15/187;
(Continued)

(56) References Cited

U.S. PATENT DOCUMENTS 9,600,231 B1* 3/2017 Sun .................. G10L 15/14
9,792,907 B2* 10/2017 Bocklet .............. G10L 15/14
(Continued)

FOREIGN PATENT DOCUMENTS

JP 2018-155957 A 10/2018

OTHER PUBLICATIONS

G. Chen, C. Parada and G. Heigold, "Small-footprint keyword spotting using deep neural networks," 2014 IEEE International Conference on Acoustics, Speech and Signal Processing (ICASSP), 2014, pp. 4087-4091 (Year: 2014).*
(Continued)

*Primary Examiner* — Michelle M Koeth
*Assistant Examiner* — Nandini Subramani
(74) *Attorney, Agent, or Firm* — Oblon, McClelland, Maier & Neustadt, L.L.P.

(57) ABSTRACT

According to one embodiment, an information processing apparatus includes following units. The acquisition unit acquires first training data including a combination of a voice feature quantity and a correct phoneme label of the voice feature quantity. The training unit trains an acoustic model using the first training data in a manner to output the correct phoneme label in response to input of the voice feature quantity. The extraction unit extracts from the first training data, second training data including voice feature quantities of at least one of a keyword, a sub-word, a syllable, or a phoneme included in the keyword. The adaptation processing unit adapts the trained acoustic model using the second training data to a keyword detection model.

9 Claims, 12 Drawing Sheets

(51) Int. Cl.
G10L 15/06 (2013.01)
G10L 15/187 (2013.01)
G10L 15/22 (2006.01)
G10L 15/08 (2006.01)

(52) U.S. Cl.
CPC .......... *G10L 15/187* (2013.01); *G10L 15/22* (2013.01); *G10L 2015/025* (2013.01); *G10L 2015/027* (2013.01); *G10L 2015/088* (2013.01)

(58) Field of Classification Search
CPC ......... G10L 2015/027; G10L 2015/025; G10L 2015/088; G10L 15/16; G10L 2015/0633; G10L 25/51
See application file for complete search history.

(56) References Cited

U.S. PATENT DOCUMENTS

| | | | |
|---|---|---|---|
| 9,953,634 B1* | 4/2018 | Pearce | G10L 15/063 |
| 10,304,440 B1* | 5/2019 | Panchapagesan | G10L 15/08 |
| 10,553,206 B2 | 2/2020 | Fujimura | |
| 10,832,129 B2* | 11/2020 | Fukuda | G10L 15/16 |
| 2015/0125594 A1* | 5/2015 | Haug | H01M 4/8642 |
| | | | 427/115 |
| 2015/0127594 A1* | 5/2015 | Parada San Martin | |
| | | | G10L 15/16 |
| | | | 706/16 |
| 2015/0302847 A1* | 10/2015 | Yun | G10L 15/07 |
| | | | 704/251 |
| 2019/0371311 A1* | 12/2019 | Patel | G06F 3/167 |

OTHER PUBLICATIONS

J. Liu, Z. Ling, S. Wei, G. Hu and L. Dai, "Cluster-based senone selection for the efficient calculation of deep neural network acoustic models," 2016 10th International Symposium on Chinese Spoken Language Processing (ISCSLP), 2016 (Year: 2016).*
Chen, G., Parada, C., & Heigold, G. (2014, May). Small-footprint keyword spotting using deep neural networks. In 2014 IEEE International Conference on Acoustics, Speech and Signal Processing (ICASSP) (pp. 4087-4091). IEEE. (Year: 2014).*
G. Heigold et al., "Multilingual acoustic models using distributed deep neural networks," 2013 IEEE International Conference on Acoustics, Speech and Signal Processing, 2013, pp. 8619-8623 (Year: 2013).*
Chen, G., Parada, C., & Heigold, G. (May 2014). Small-footprint keyword spotting using deep neural networks. In 2014 IEEE International Conference on Acoustics, Speech and Signal Processing (ICASSP) (pp. 4087-4091). IEEE. (Year: 2014).*
J. Liu, Z. Ling, S. Wei, G. Hu and L. Dai, "Cluster-based senone selection for the efficient calculation of deep neural network acoustic models," 2016 10th International Symposium on Chinese Spoken Language Processing (ISCSLP), 2016, pp. 1-5 (Year: 2016).*
Chen et al., "Small-Footprint Keyword Spotting Using Deep Neural Networks", IEEE International Conference on Acoustics, Speech, and Signal Processing (ICASSP), 2014, 5 pages.
Sainath et al., "Convolutional Neural Networks For Small-Footprint Keyword Spotting", International Speech Communication Association (INTERSPEECH), 2015, 5 pages.
Wu et al., "Monophone-Based Background Modeling for Two-Stage On-Device Wake Word Detection", IEEE International Conference on Acoustics, Speech and Signal Processing (ICASSP), 2018, 5 pages.

* cited by examiner

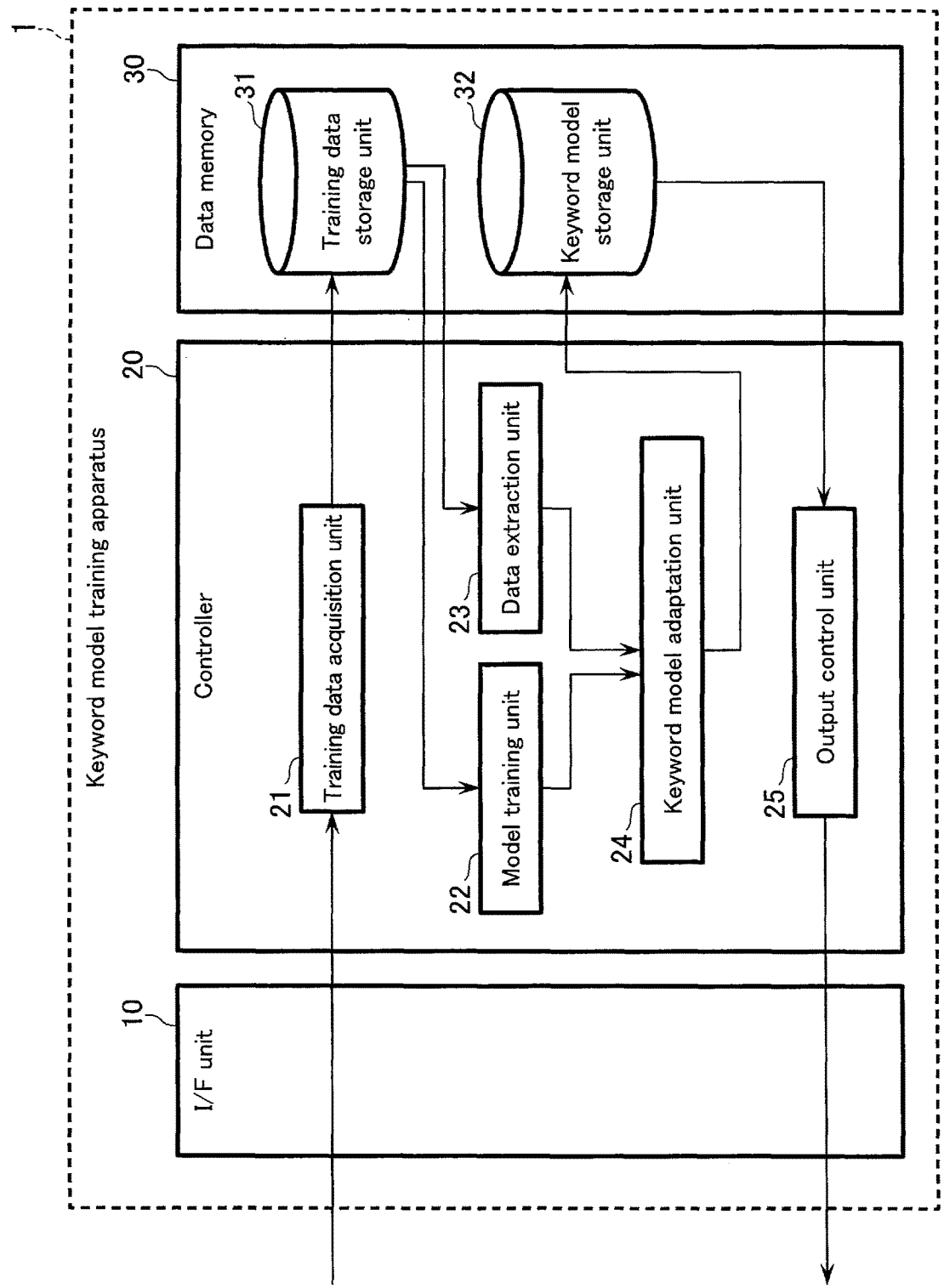
F I G. 2

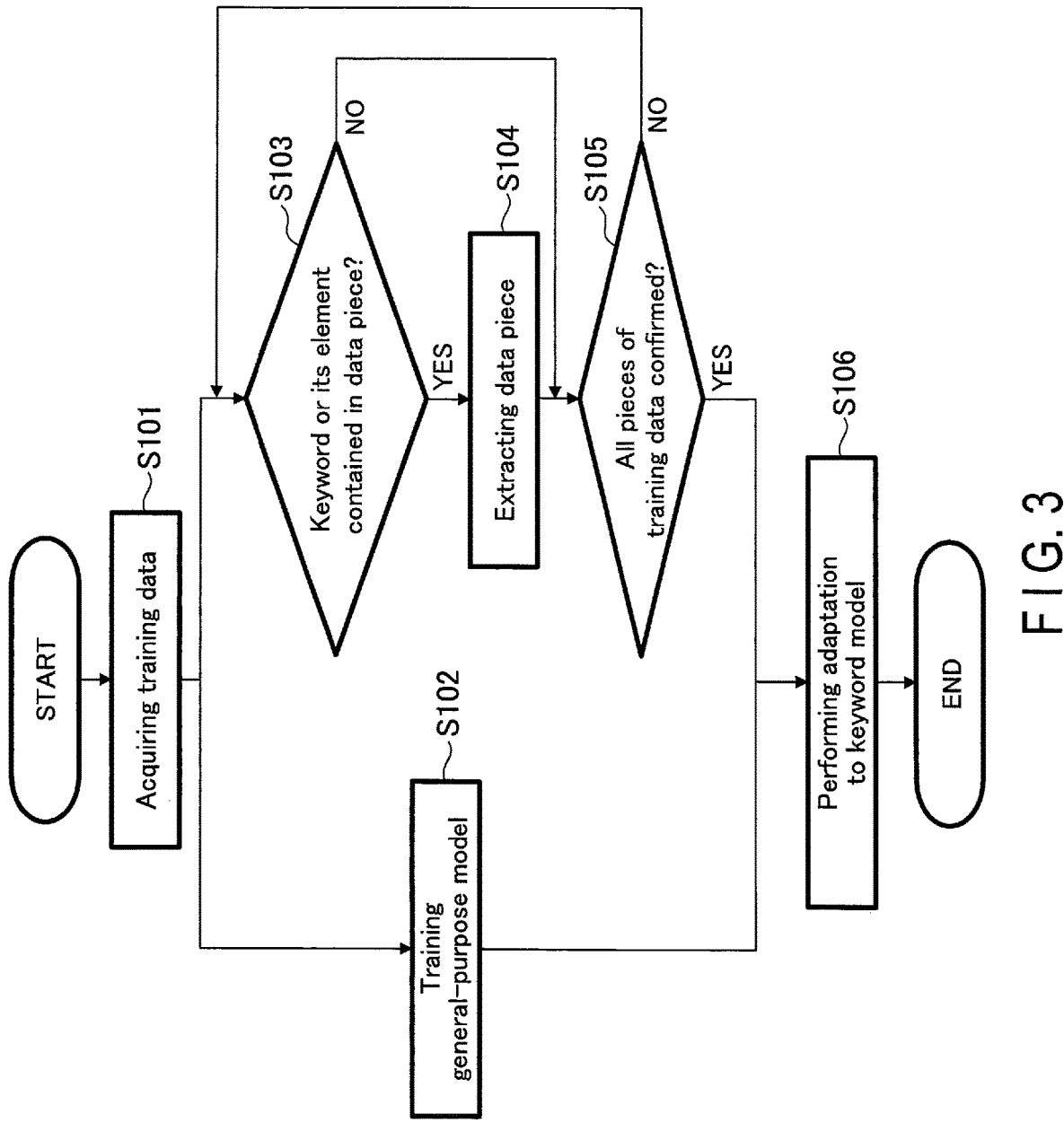
F I G. 3

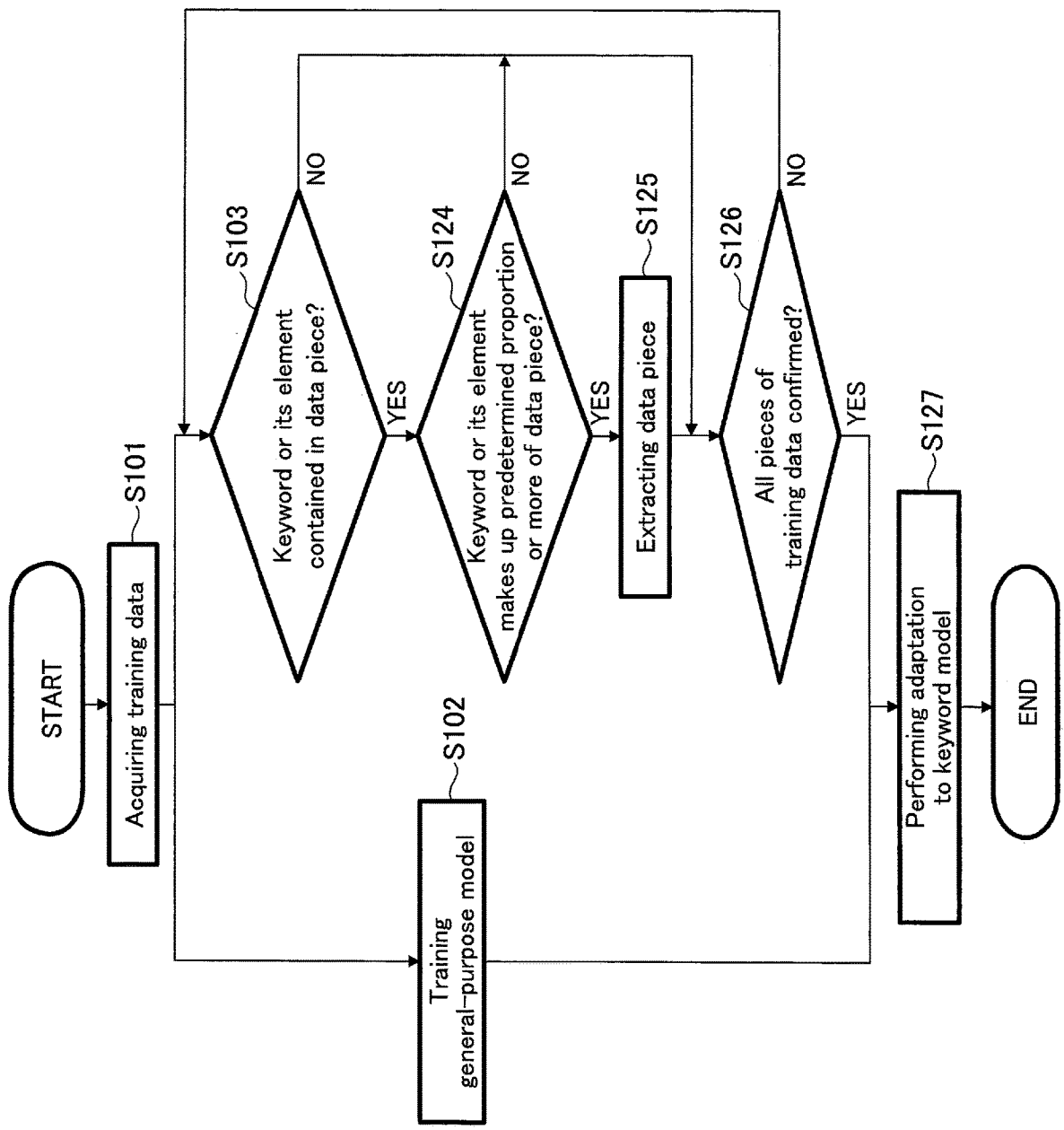
F I G. 6

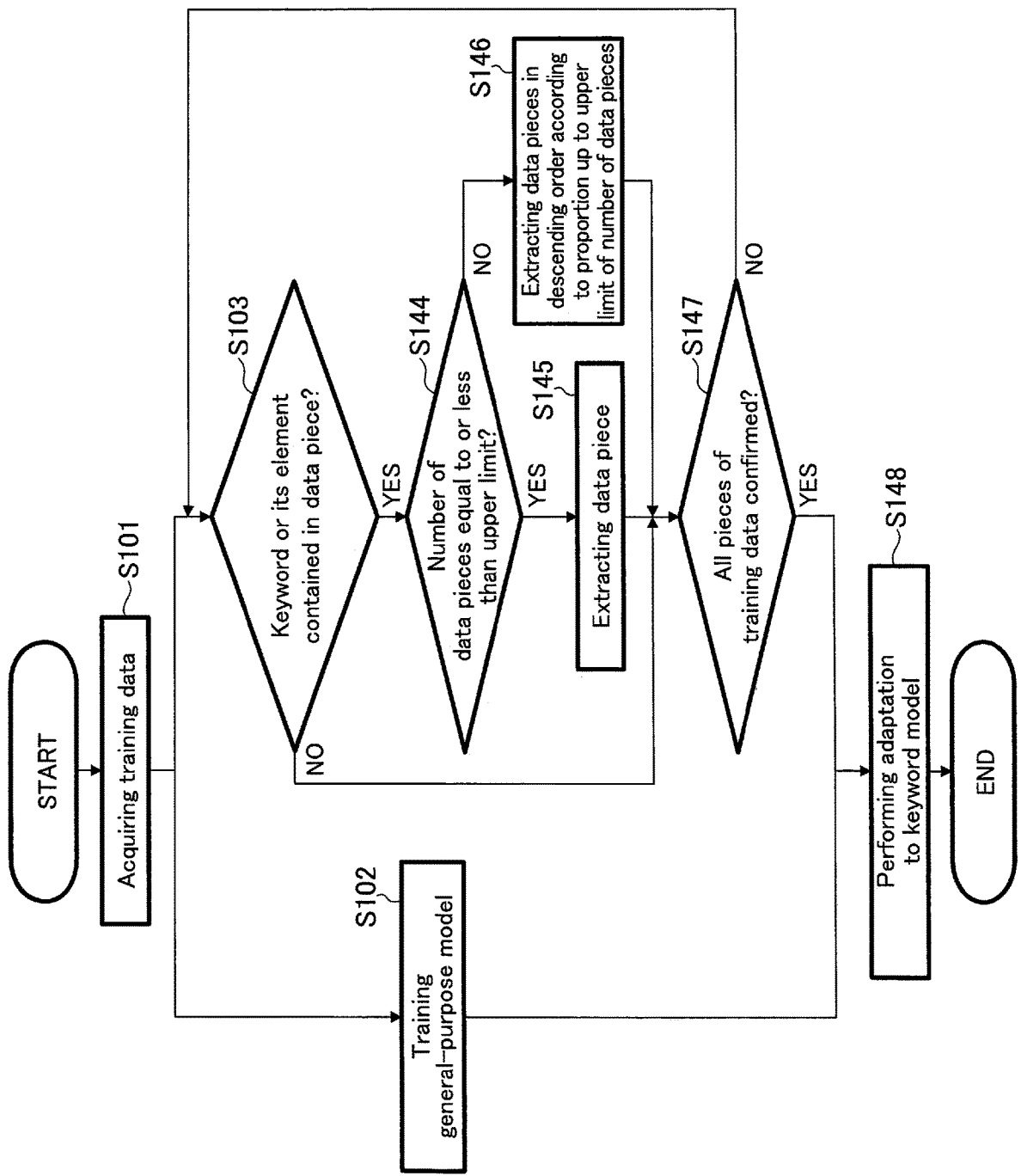
F I G. 8

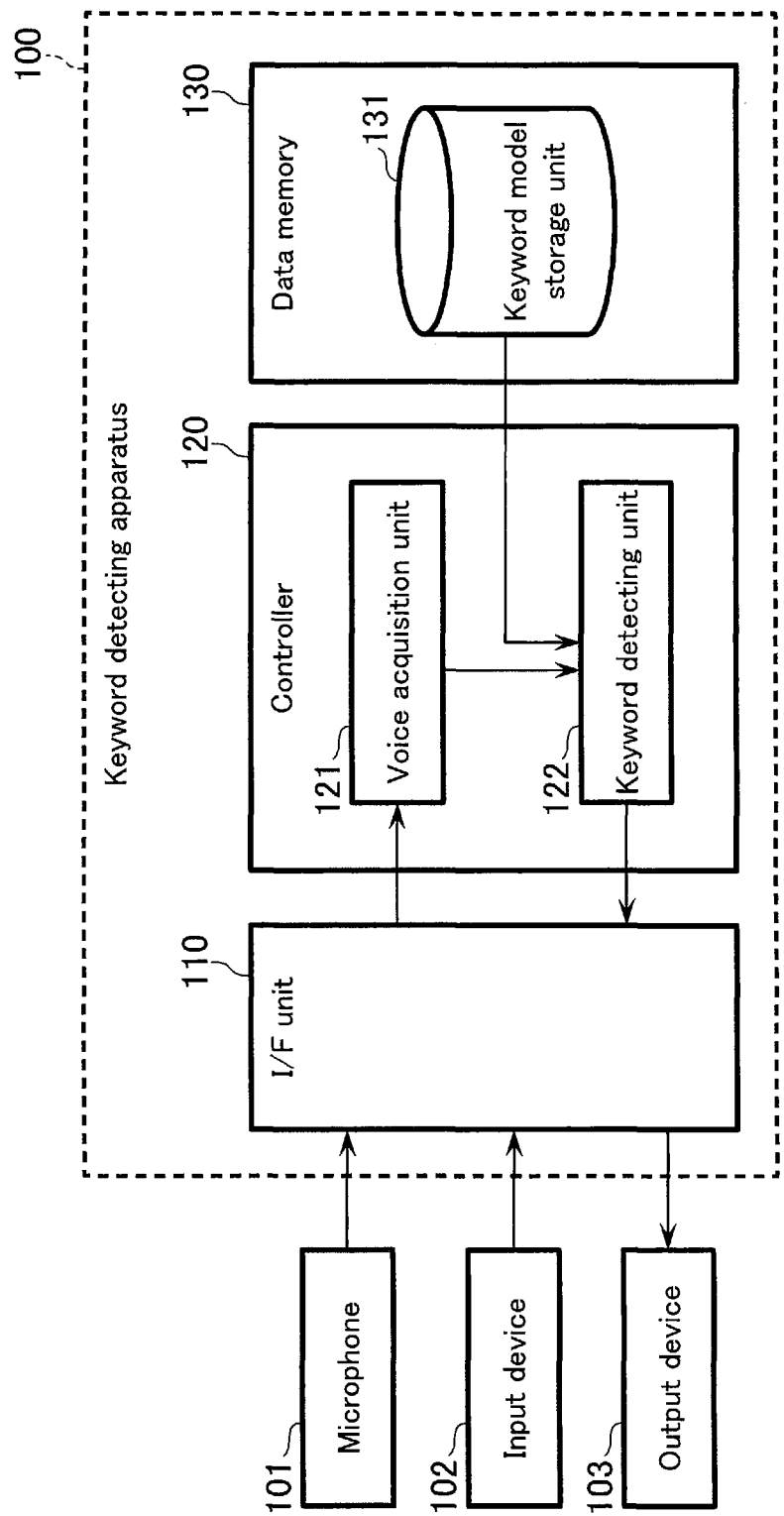
F I G. 10

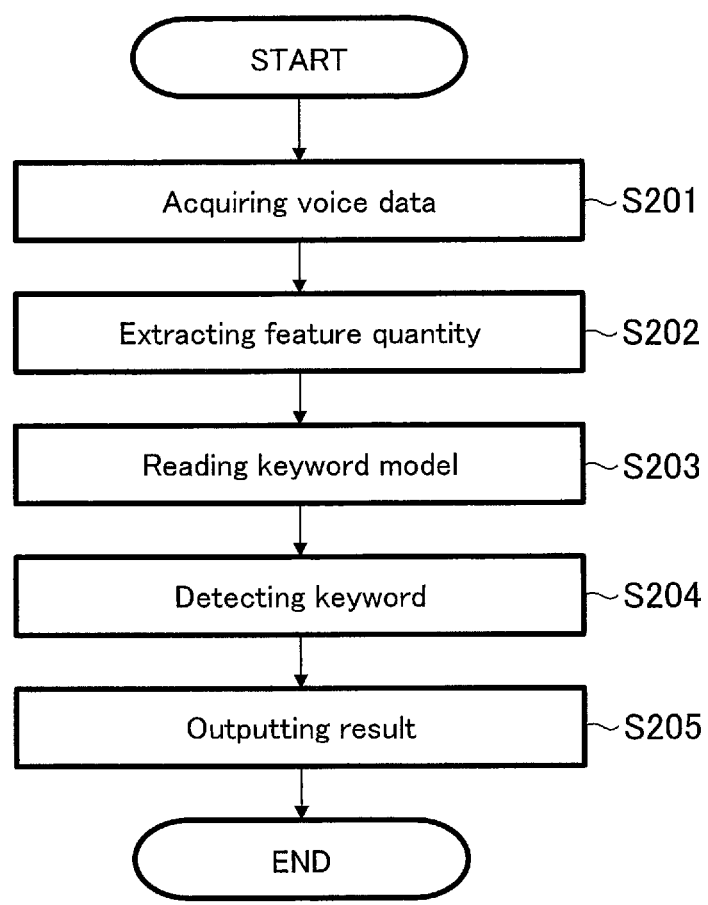
F I G. 11

INFORMATION PROCESSING APPARATUS, KEYWORD DETECTING APPARATUS, AND INFORMATION PROCESSING METHOD

CROSS-REFERENCE TO RELATED APPLICATIONS

This application is based upon and claims the benefit of priority from Japanese Patent Application No. 2019-157158, filed Aug. 29, 2019, the entire contents of which are incorporated herein by reference.

FIELD

Embodiments described herein relate generally to an information processing apparatus, a keyword detecting apparatus, and an information processing method.

BACKGROUND

In recent years, smart speakers adapted for voice-actuated control have spread rapidly. Smart speakers are activated upon detection of a specific keyword, which is also called a "wake word", from voice. Users can activate smart speakers only by uttering such a keyword and continue various types of control. This requires a keyword model for a keyword to be detected from voice.

BRIEF DESCRIPTION OF THE DRAWINGS

FIG. 2 is a block diagram showing an example of a function configuration of an information processing apparatus according to the first embodiment.

FIG. 3 is a flowchart showing an example of a processing procedure and content of processing carried out by the information processing apparatus according to the first embodiment.

FIG. 6 is a flowchart showing an example of a processing procedure and content of processing carried out by an information processing apparatus according to a third embodiment.

FIG. 8 is a flowchart showing an example of a processing procedure and content of processing carried out by an information processing apparatus according to a fifth embodiment.

FIG. 10 is a block diagram showing an example of a function configuration of a keyword detecting apparatus according to a seventh embodiment.

FIG. 11 shows an example of a processing procedure and content of processing carried out by the keyword detecting apparatus according to the seventh embodiment.

DETAILED DESCRIPTION

Hereinafter, various embodiments will be described with reference to the accompanying drawings.

An object of the embodiments is to provide an information processing apparatus, a keyword detecting apparatus, and an information processing method that can provide a technique by which a keyword model can be trained efficiently using a limited volume of data.

According to one embodiment, an information processing apparatus includes a first data acquisition unit, a training unit, an extraction unit, and an adaptation processing unit. The first data acquisition unit acquires first training data including a combination of a voice feature quantity and a correct phoneme label of the voice feature quantity. The training unit trains an acoustic model using the first training data in a manner to output the correct phoneme label in response to input of the voice feature quantity. The extraction unit extracts from the first training data, second training data including voice feature quantities of at least one of a keyword, a sub-word included in the keyword, a syllable included in the keyword, or a phoneme included in the keyword. The adaptation processing unit adapts the trained acoustic model using the second training data to a keyword model for detection of the keyword.

First Embodiment (1) Keyword Model Training Apparatus

Figure 1:
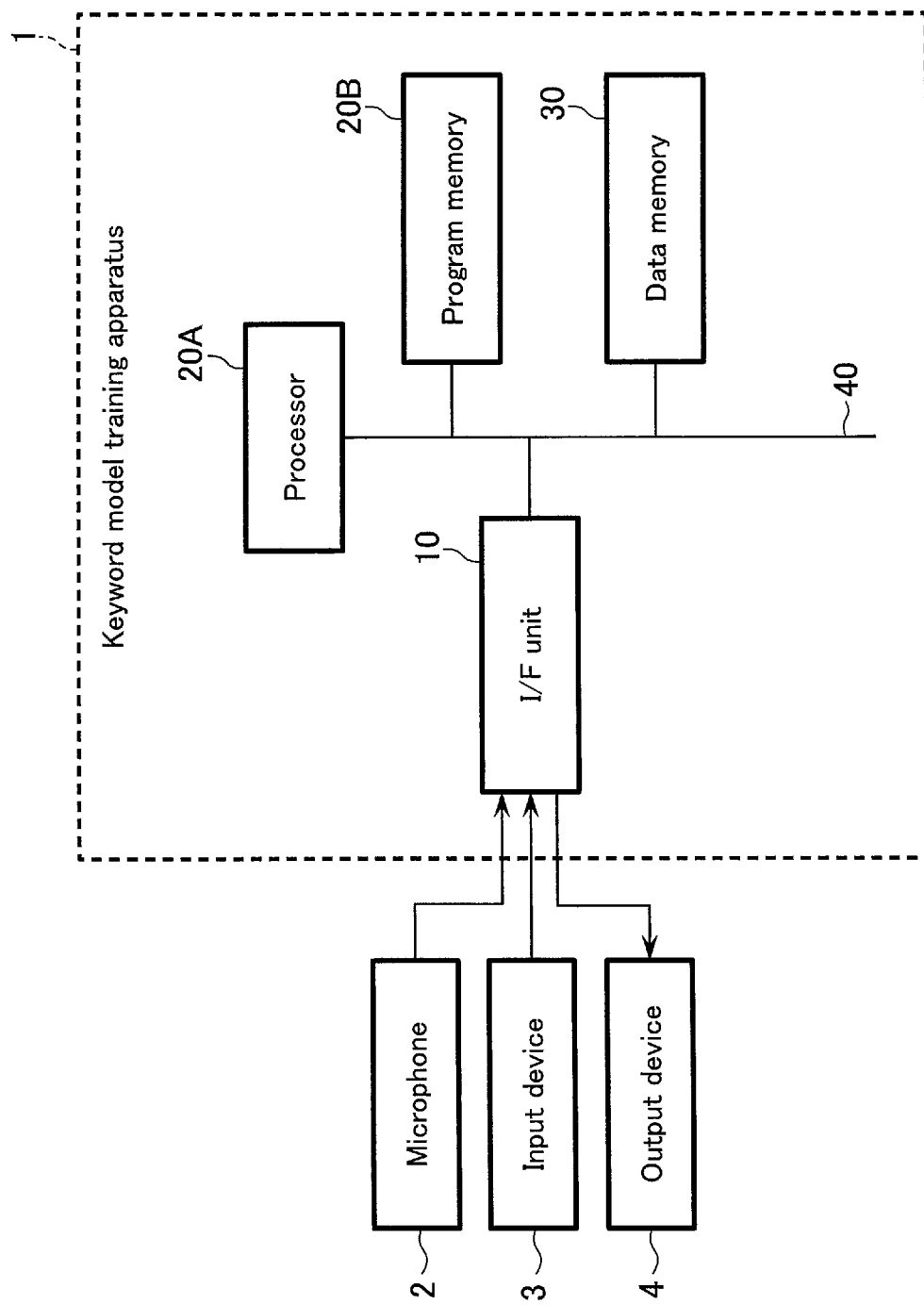
FIG. 1 is a block diagram showing an example of a system configuration of an information processing apparatus according to a first embodiment.

FIG. 1 is a block diagram showing an example of a keyword model training apparatus 1 as an information processing apparatus according to a first embodiment. For example, the keyword model training apparatus 1 is a server computer or a personal computer, and is used for training of a keyword model used for detection of a keyword.

The keyword model training apparatus 1 includes a hardware processor 20A such as a Central Processing Unit (CPU), etc. A program memory 20B, a data memory 30, and an interface (I/F) unit 10 are connected to the above-mentioned hardware processor via a bus 40.

The I/F unit 10 functions to receive training data from an external device and output the data to a controller 20. The I/F unit 10 further functions to output to an external device, information on a trained model output from the controller 20. The I/F unit 10 may include a communication interface. The communication interface includes, for example, more than one wired or wireless communication interface, and enables transmission and reception of information between the keyword model training apparatus 1 and an external device. For example, a wired LAN is used as the wired interface, and an interface that adopts a low power radio data communication standard such as wireless LAN or Bluetooth (registered trademark) is used as the wireless interface.

Furthermore, a microphone 2, an input device 3, and an output device 4 may be connected to the I/F unit 10. For example, the I/F unit 10 functions to capture voice collected by the microphone 2, as a voice signal, and pass the voice signal to the controller 20. The I/F unit 10 functions to capture data input via the input device 3 such as a keyboard, a touch-pad, a mouse, etc., and pass the data to the controller 20. The I/F unit 10 further functions to output data output from the controller 20 to the output device 4 that includes a display device using, e.g., liquid crystal or organic Electro Luminescence (EL), a speaker configured to output voice, etc. The devices used as the microphone 2, the input device 3, and the output device 4 may be those built into the keyword model training apparatus 1, or may be those of another information terminal that is communicable via a network.

Used as storage media for the program memory 20B is, for example, a combination of a non-volatile memory such as Hard Disk Drive (HDD) or Solid State Drive (SSD), configured to be always writable and readable, and a non-volatile memory such as a ROM. The program memory 20B stores programs necessary for execution of various types of control processing according to the embodiment.

Used as storage media for the data memory 30 is, for example, a combination of a non-volatile memory such as an HDD or SSD, configured to be always writable and readable, and a non-volatile memory such as Random Access Memory (RAM). The data memory 30 is used in order to store various types of data that are acquired or generated during the process of information processing.

Training of a keyword model for keyword detection generally requires keyword utterance data obtained from a large number of speakers, and thus involves a recording cost for recording the data. For example, certain reports state that 40,000 utterances are required for a keyword model to be trained to learn a specific keyword.

The present embodiment provides a technique by which a keyword model can be trained efficiently using a limited volume of data.

FIG. 2 is a block diagram showing a function configuration of the keyword detecting apparatus 1 according to the first embodiment.

The data memory 30 has a storage area provided with a training data storage unit 31 and a keyword model storage unit 32.

The training data storage unit 31 is used to store training data acquired by the controller 20. The training data includes a combination of a voice feature quantity and its correct phoneme label.

The keyword model storage unit 32 is used to store a trained keyword model. Herein, the trained keyword model means a model trained to detect a specific keyword.

The controller 20 includes the aforementioned hardware processor 20A and the aforementioned program memory 20B, and further includes, as processing function units, a training data acquisition unit 21, a model training unit 22, a data extraction unit 23, a keyword model adaptation unit 24, and an output control unit 25. Those processing function units are realized by causing the aforementioned hardware processor 20A to execute a program stored in the program memory 20B. The controller 20 may be realized in other various forms including an integrated circuit such as an Application Specific Integrated Circuit (ASIC), Field-Programmable Gate Array (FPGA), etc. The aforementioned program may be provided via a network.

The training data acquisition unit 21 acquires, as the first data acquisition unit, training data (first training data) including a combination of a voice feature quantity and its correct phoneme label, and stores the data in the training data storage unit 31.

With the use of training data read from the training data storage unit 31, the model training unit 22 executes processing to train an acoustic model in a manner to output a correct phoneme label in response to input of a voice feature quantity. A voice feature quantity may be Mel Frequency Cepstral Coefficient (MFCC) or may be Mel filter bank. Alternatively, a pitch feature quantity, Δ or ΔΔ features thereof, or a combination of feature quantities thereof may be used. The following description assumes that an MFCC feature quantity is used as a voice feature quantity.

The data extraction unit 23 executes, as an extraction unit, processing to extract from training data read from the training data storage unit 31, a data piece including a preset keyword or a sub-word, a syllable, or a phoneme included in the keyword.

The keyword model adaptation unit 24 executes, as an adaptation processing unit, processing to adapt a trained acoustic model to a keyword model for keyword detection, using at least a data piece (second training data) extracted by the data extraction unit 23. The keyword model adaptation unit 24 stores the adapted keyword model in the keyword model storage unit 32. The keyword model adaptation unit 24 is also capable of reading a keyword model stored in the keyword model storage unit 32 and retraining to update this keyword mode.

The output control unit 25 executes processing to output a result of processing by the controller 20 to an external device via the I/F unit 10. For example, in response to a request from an external device, the output control unit 25 reads information on a keyword model stored in the keyword model storage unit 32, generates output data, and outputs this data to the output device 4 or another external device via the I/F unit 10.

Next, information processing operation by the keyword model training apparatus 1 configured as described above will be described. FIG. 3 is a flowchart showing a processing procedure and a processing content.

In step S101, the keyword model training apparatus 1 acquires training data under control of the training data acquisition unit 21. The training data includes a combination of a voice feature quantity and its correct phoneme label. For example, a voice feature quantity is extracted in the following manner.

First, utterance voice is collected using a microphone, etc., and is output as a voice waveform. An analog spectrum of this voice waveform is sampled at, for example, 16 kHz, and an amplitude value of one sample of a digital spectrum is expressed in 16 bits. A set of 256 samples of this analog spectrum is shifted by 128 samples and is cut out. Under the condition that a set of 256 samples is set to one frame, the 12-dimensional MFCC feature quantity is calculated from one frame. A 36-dimensional MFCC feature quantity, obtained by coupling MFCC feature quantities of three frames together is used as a voice feature quantity.

A correct label is information on a pronunciation corresponding to a voice feature quantity. Herein, a Hidden Markov Model (HMM) of a phoneme corresponding to a 36-dimensional voice feature quantity is used as a label.

Subsequently, in step S102, the keyword model training apparatus 1 reads the aforementioned training data from the training data storage unit 31 under control of the model training unit 22, and performs training of an acoustic model (generic model) using the aforementioned training data. This acoustic model is an acoustic model by which a general utterance can be recognized. Hereinafter, an acoustic model to be trained by the model training unit 22 is referred to as a generic model in order to make a distinction from a keyword model for keyword detection. A model may take the form of a Deep Neural Network (DNN), Convolution Neural Network (CNN), Recurrent Neural Network (RNN), or Long Short-Term Memory (LSTM). This description assumes that DNN is used as the form of the model.

In step S103, on the other hand, under control of the data extraction unit 23, the keyword model training apparatus 1 reads the aforementioned training data from the training data storage unit 31, and judges whether or not the training data includes a preset keyword or an element of the keyword. In the case of judgment that the training data includes such a preset keyword or its element ("YES"), the processing proceeds to step S104. In the case of judgment that the training data does not include such a preset keyword or its element ("NO"), the processing proceeds to step S105. Herein, a "keyword" is a target of keyword detection, and may be set at will. An "element of the keyword" includes a sub-word as part of the keyword, a syllable as part of the keyword, or a phoneme as part of the keyword.

In step S104, the keyword model training apparatus 1 extracts from training data read from the training data storage unit 31, a data piece including a keyword, a sub-word as part of the keyword, a syllable as part of the keyword, or a phoneme as part of the keyword, under control of the data extraction unit 23. For example, assume that a keyword is set to "de n ki tsu ke te (turn a light on)". In this case, a sub-word corresponds to "de n ki" and "tsu ke te". A syllable corresponds to "de", "n", "ki", "tsu", "ke", and "te". A phoneme corresponds to "d" "e", "N", "kk", "i", "ts", "u", "kk", "e", "t", and "e".

In more detail, in the case of extracting data as a keyword, the data extraction unit 23 extracts a data piece including "de n ki tsu ke te" from training data. In the case of extracting data as a sub-word, the data extraction unit 23 extracts a data piece including "de n ki" or "tsu ke te" as part of sub-words from training data. In the case of extracting data as a syllable, the data extraction unit 23 extracts a data piece including "de", "n", "ki", "tsu", "ke", or "te" as part of syllables from training data. In the case of extracting data in terms of phonemes, the data extraction unit 23 extracts a data piece including "d" "e", "N", "kk", "i", "ts", "u", "kk", or "t" as part of phonemes from training data. Any overlapped sub-word, syllable, or phoneme may be omitted. In this example, phonemes "e" and "kk" are overlapped more than once. Thus, overlapped portions are omitted to avoid overlapped data extraction.

Next, in step S105, under control of the data extraction unit 23, the keyword model training apparatus 1 judges whether all pieces of training data have been confirmed or not in terms of the presence or absence of a keyword or its element. In the case of judgment that all pieces of data have been confirmed (YES), the processing proceeds to step S106. In the case of judgment that not all pieces of data have been confirmed (NO), the processing returns to step S103 to continuously judge whether or not training data includes a keyword or its element.

In step S106, under control of the keyword model adaptation unit 24, the keyword model training apparatus 1 executes processing to adapt a trained generic model to a keyword model, using data including at least an extracted data piece.

The keyword model adaptation unit 24 stores the adapted keyword model in the keyword model storage unit 32. Thereafter, on a timely basis or in response to a request from an external device, the output control unit 25 is capable of reading information on the adapted keyword model stored in the keyword model storage unit 32, thereby generating and outputting necessary output data.

As described above, according to the first embodiment, the keyword model training apparatus 1 acquires training data including a voice feature quantity and its correct phoneme label, and trains a generic model using the training data, in a manner to output a correct phoneme label in response to input of a voice feature quantity. On the other hand, the keyword model training apparatus 1 extracts a data pieces including a preset keyword, a sub-word included in the keyword, a syllable included in the keyword, or a phoneme included in the keyword, and adapts the aforementioned trained generic model using at least the extracted data piece, to a keyword model for detection of the keyword.

Herein, a keyword mode can also be trained, not adapted, from an initial state using a data piece extracted from training data, without using a trained generic model. However, depending on the amount of extracted data, a keyword model may not be trained properly from an initial state.

According to the first embodiment, the keyword model adaptation unit 24 adapts a trained generic model to a keyword model, using a data piece extracted from training data. That is, the keyword model training unit 24 performs retraining of a keyword model adapted for a specific keyword, based on a trained generic model. This ensures generation of a keyword model even from limited data. In addition, training data includes much voice other than a keyword; however, only data pieces including a keyword or part of the keyword are extracted. This enables more efficient adaptation to an appropriate keyword model.

Second Embodiment

The keyword model training apparatus 1 as the information processing apparatus according to the second embodiment performs adaptation of a keyword model with the additional use of keyword utterance data including utterance voice of a keyword.

The keyword model training apparatus 1 according to the second embodiment may have a similar system configuration to that of the keyword model training apparatus 1 according to the first embodiment, shown in FIG. 1.

Figure 4:
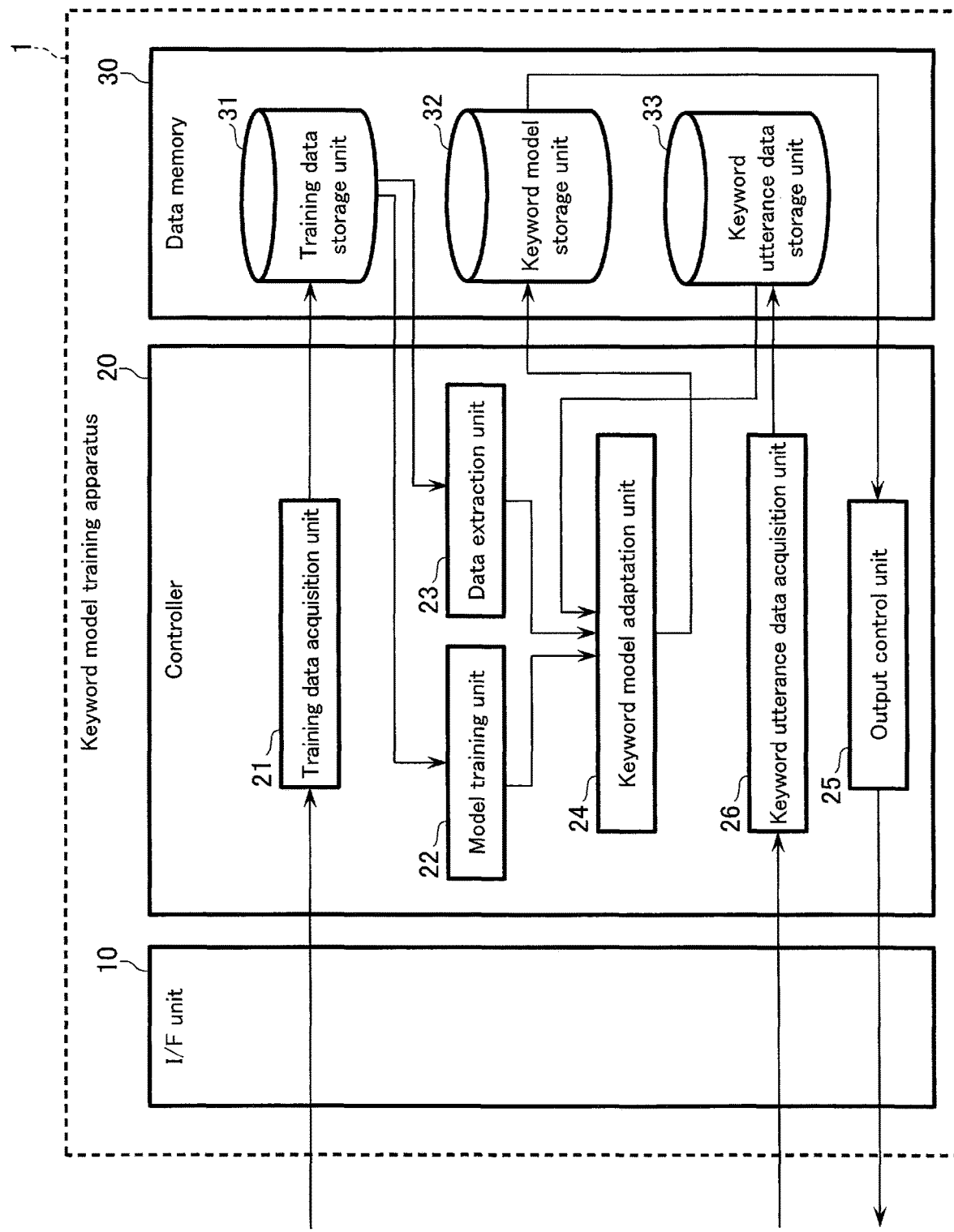
FIG. 4 is a block diagram showing an example of a function configuration of an information processing apparatus according to a second embodiment.

FIG. 4 is a block diagram showing a function configuration of the keyword detecting apparatus 1 according to the second embodiment. In FIG. 4, the same structures as those of the keyword model training apparatus 1 according to the first embodiment shown in FIG. 2 are assigned with the same numerals, and a detailed description of such structures is omitted.

The keyword model training apparatus 1 according to the second embodiment includes, within the controller 20, a keyword utterance data acquisition unit 26 as shown in FIG. 4, in addition to the training data acquisition unit 21, the model training unit 22, the data extraction unit 23, the keyword model adaptation unit 24, and the output control unit 25 as in the first embodiment. The data memory 30 has the storage area provided with a keyword utterance data storage unit 33 in addition to the training data storage unit 31 and the keyword model storage unit 32.

The keyword utterance data acquisition unit 26 acquires, as the second data acquisition unit, available keyword utterance data at a given timing. The keyword utterance data acquisition unit 26 may acquire keyword utterance voice input via the microphone 2 and generate keyword utterance data based on the acquired voice. Alternatively, the keyword utterance data acquisition unit 26 may acquire keyword utterance data prepared in advance from an external device.

The keyword utterance data storage unit 33 is used to store therein keyword utterance data acquired by the keyword utterance data acquisition unit 26.

The keyword model adaptation unit 24 receives from the model training unit 22, a generic model trained as in the first embodiment, receives from the data extraction unit 23, a data piece extracted as in the first embodiment, reads keyword utterance data stored in the keyword utterance data storage unit 33, and adapts the generic model trained using the extracted data piece and the keyword utterance data, to a keyword model.

Figure 5:
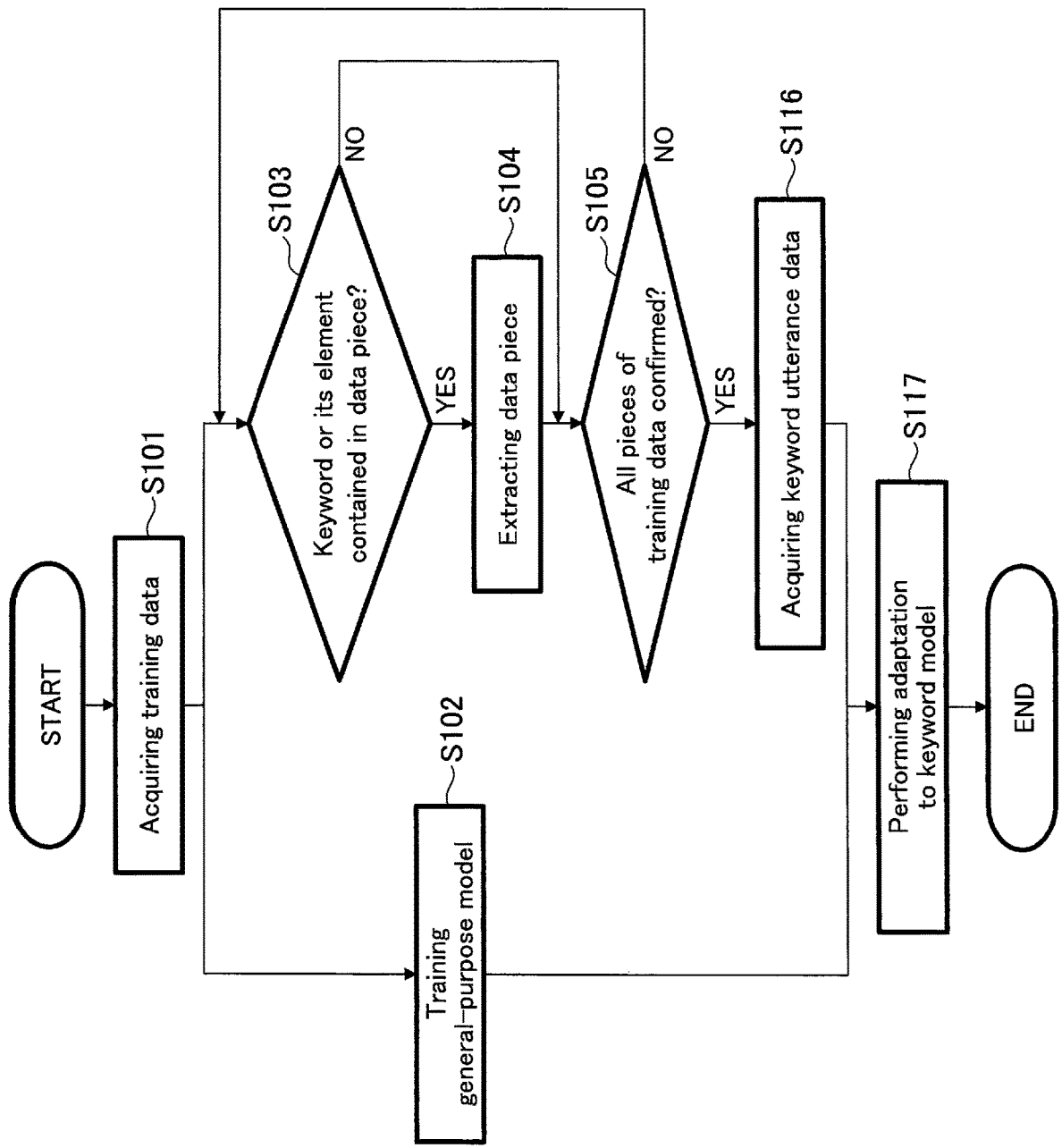
FIG. 5 is a flowchart showing an example of a processing procedure and content of processing carried out by the information processing apparatus according to the second embodiment.

FIG. 5 shows a processing content and a processing procedure of the keyword model training apparatus 1 according to the second embodiment. In FIG. 5, the same processing as that of the first embodiment shown in FIG. 3 is assigned with the same numeral, and a detailed description for such processing is omitted.

In step S101, as in the first embodiment, the keyword model training apparatus 1 acquires training data under control of the training data acquisition unit 21. In step S102, the keyword model training apparatus 1 trains a generic model using the aforementioned training data under control of the model training unit 22. In step S103, under control of the data extraction unit 23, the keyword model training apparatus 1 judges whether or not the training data includes a preset keyword or an element of the keyword. In the case of judgment that the training data includes such a preset keyword or its element ("YES"), the processing proceeds to step S104. In the case of judgment that the training data does not include such a preset keyword or its element ("NO"), the processing proceeds to step S105. In step S104, the data extraction unit 23 extracts a data piece including a keyword or its element from training data. In step S105, under control of the data extraction unit 23, the keyword model training apparatus 1 judges whether or not all pieces of training data have been confirmed. In the case of judgment that all pieces of data have been confirmed (YES), the processing proceeds to step S116. In the case of judgment that not all pieces of data have been confirmed (NO), the processing returns to step S103 to continuously judge whether or not training data includes a keyword or its element.

Next, in step S116, under control of the keyword utterance data acquisition unit 26, the keyword model training apparatus 1 acquires keyword utterance data and stores it in the keyword utterance data storage unit 33. This step may be performed at a given timing.

In step S117, under control of the keyword model adaptation unit 24, the keyword model training apparatus 1 executes processing to read keyword utterance data from the keyword utterance data storage unit 33 and to adapt a trained generic model to a keyword model using an extracted data piece and the keyword utterance data. Thereafter, the keyword model adaptation unit 24 stores the adapted keyword model in the keyword model storage unit 32. On a timely basis or in response to a request, the output control unit 25 is capable of reading and outputting information on the adapted keyword model.

As described above, in the second embodiment, the keyword model training apparatus 1 performs adaptation of a keyword model by further acquiring keyword utterance data that a specific keyword is uttered.

Described in the first embodiment is a method of training a keyword model in the absence of keyword utterance data. In the second embodiment, the keyword model adaptation unit 24 performs adaptation to a keyword model based on a trained generic model, using a data piece extracted from training data and acquired keyword utterance data. Adaptation to a keyword model can also be performed using only keyword utterance data without an extracted data piece; however, such adaptation requires keyword utterance data obtained from a large number of speakers.

According to the second embodiment, data extracted from training data and keyword utterance data differ from each other in terms of speaker. Therefore, adaptation to a keyword model using a data piece extracted from training data and keyword utterance data enables the keyword model to be trained even with a small volume of keyword utterance data.

Third Embodiment

The keyword model training apparatus 1 as the information processing apparatus according to the third embodiment extracts from training data, a data piece in which letters of a keyword, letters of a sub-word as part of the keyword, syllables as part of the keyword, or phonemes as part of the keyword make up a predetermined proportion or more of the data piece.

The keyword model training apparatus 1 according to the third embodiment may have a system configuration and a functional configuration which are similar to those of the keyword model training apparatus 1 according to the first embodiment shown in FIGS. 1 and 2.

FIG. 6 shows a processing content and a processing procedure of the keyword model training apparatus 1 according to the third embodiment. In FIG. 6, the same processing as that of the first embodiment shown in FIG. 3 is assigned with the same numeral, and a detailed description for such processing is omitted.

In step S101, as in the first embodiment, the keyword model training apparatus 1 acquires training data under control of the training data acquisition unit 21. In step S102, the keyword model training apparatus 1 trains a generic model using the aforementioned training data under control of the model training unit 22. In step S103, under control of the data extraction unit 23, the keyword model training apparatus 1 judges whether or not the training data includes a preset keyword or an element of the keyword. In the case of judgment that the training data includes such a preset keyword or its element ("YES"), the processing proceeds to step S124. In the case of judgment that the training data does not include such a preset keyword or its element ("NO"), the processing proceeds to step S126.

Subsequently, in step S124, under control of the data extraction unit 23, the keyword model training apparatus 1 further judges the data judged as including a keyword or its element, as to whether or not the keyword or its elements makes up a predetermined proportion or more of the data. In the case of judgment that the keyword or its elements makes up a predetermined proportion or more of the data ("YES"), the processing proceeds to step S125. In the case of judgment that the keyword or its elements does not make up a predetermined proportion or more of the data ("NO"), the processing proceeds to step S126. In step S125, the data extraction unit 23 extracts the aforementioned data.

In more detail, the data extraction unit 23 judges whether or not the proportion in number of letters of a keyword, letters of a sub-word as part of the keyword, syllables as part of the keyword, or phonemes as part of the keyword to letters, syllables, or phonemes of a data piece as a judgment target is a predetermined proportion threshold or more. In the case of judgment that the proportion is a predetermined proportion threshold or more, the aforementioned data piece is extracted from training data.

For example, assume that extraction using a keyword is performed under the condition that the keyword is set to "denki tsukete" and a proportion threshold is set to 0.5. In this case, the keyword has 6 letters. In training data, when utterance of data as a judgment target is "de n ki tsu ke te ne ru (sleep with light turned on)", this utterance has 8 letters. The proportion of the number of letters of the keyword to the number of letters of the target data piece is expressed as 6/8=0.75, which corresponds to the proportion threshold or more. Therefore, the data extraction unit 23 extracts from training data, a data piece of the utterance, "de n ki tsu ke te ne ru". On the other hand, assume that the utterance of data as a judgment target is "na n de ku ra i he ya ni i ru no ha ya ku de n ki tsu ke te (why are you in a dark room? turn a light on right now)". In this case, the number of letters is 21. The proportion of the number of letters of the keyword to the number of letters of the target data piece is expressed as 6/21=0.29, which corresponds to the proportion threshold or less. Therefore, the data extraction unit 23 does not extract from training data, a data piece of the utterance, "na n de ku ra i he ya ni i ru no ha ya ku de n ki tsu ke te".

The above manner for extraction using a keyword applies to extraction using a sub-word, a syllable, or a phoneme.

Next, in step S126, under control of the data extraction unit 23, the keyword model training apparatus 1 judges whether or not all pieces of training data have been confirmed. In the case of judgment that all pieces of data have been confirmed (YES), the processing proceeds to step S127. In the case of judgment that not all pieces of data have been confirmed (NO), the processing returns to step S103 to continuously judge whether or not training data includes a keyword or its element.

In step S127, under control of the keyword model adaptation unit 24, the keyword model training apparatus 1 executes processing to adapt a trained generic model to a keyword model, using an extracted data piece. Thereafter, the keyword model adaptation unit 24 stores the adapted keyword model in the keyword model storage unit 32. On a timely basis or in response to a request, the output control unit 25 is capable of reading and outputting information on the adapted keyword model.

As described above, in the third embodiment, the keyword model training apparatus 1 extracts a data piece in which a keyword or part of the keyword makes up a predetermined proportion or more of the data piece, and uses the extracted data piece for adaptation to a keyword model. This keeps down the ratio of extracting data pieces other than a keyword or its element.

If data extracted from training data include many utterances other than a keyword or part of the keyword, there is a risk of decreasing the keyword detection performance using an adapted keyword model.

However, according to the third embodiment, only a data piece in which a keyword or part of the keyword makes up a predetermined proportion or ratio or more of the data piece is extracted. This improves the performance of distinguishing a keyword from a non-keyword using a keyword model, thereby improving the keyword detection performance, too.

Fourth Embodiment

The keyword model training apparatus 1 as the information processing apparatus according to the fourth embodiment sets the upper limit to the number of data pieces extracted from training data.

The keyword model training apparatus 1 according to the fourth embodiment may have a system configuration and a functional configuration that are similar to those of the keyword model training apparatus 1 according to the first embodiment shown in FIGS. 1 and 2.

Figure 7:
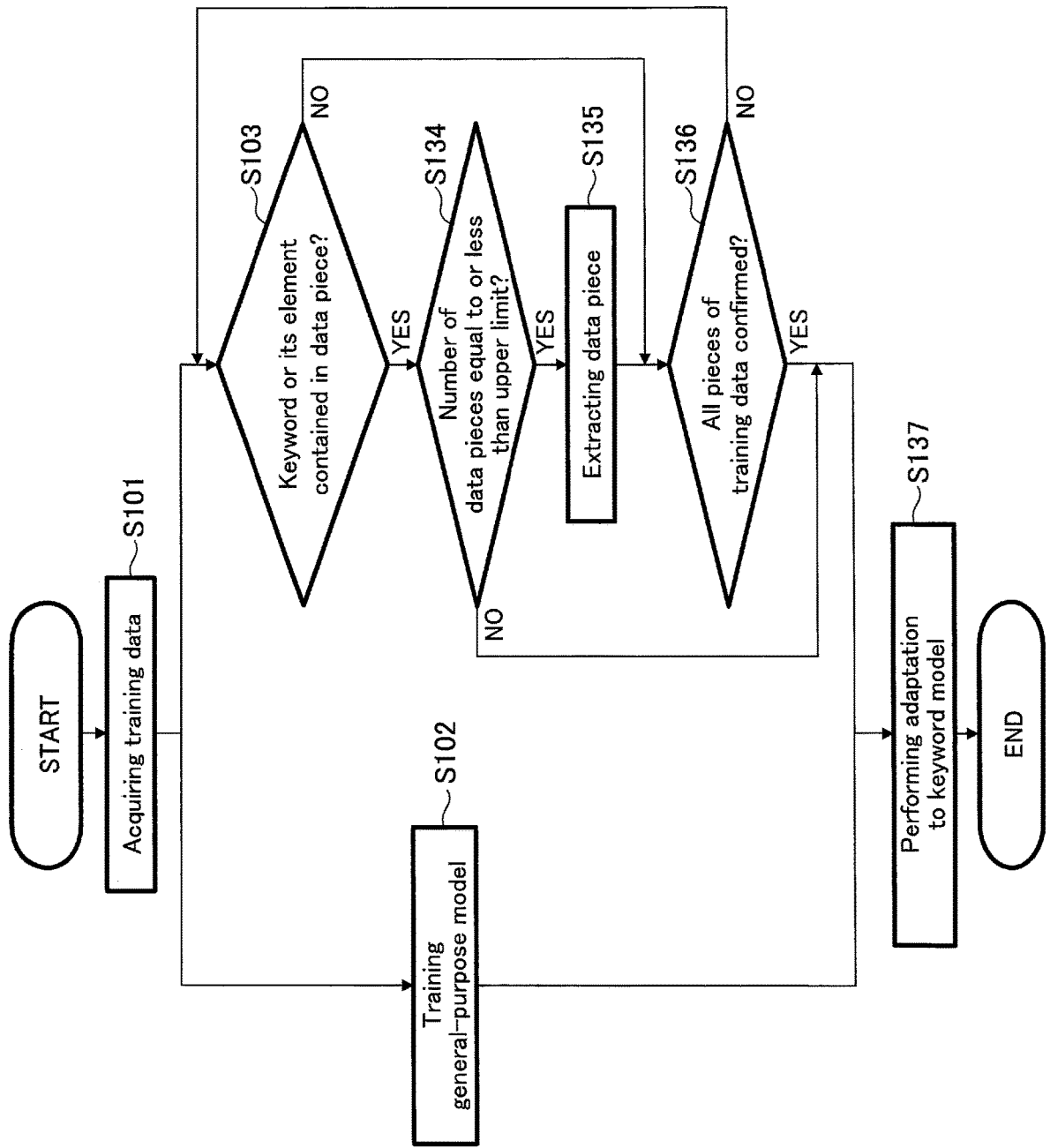
FIG. 7 is a flowchart showing an example of a processing procedure and content of processing carried out by an information processing apparatus according to a fourth embodiment.

FIG. 7 shows a processing content and a processing procedure of the keyword model training apparatus 1 according to the fourth embodiment. In FIG. 7, the same processing as that of the first embodiment shown in FIG. 3 is assigned with the same numeral, and a detailed description for such processing is omitted.

In step S101, as in the first embodiment, the keyword model training apparatus 1 acquires training data under control of the training data acquisition unit 21. In step S102, the keyword model training apparatus 1 trains a generic model using the aforementioned training data under control of the model training unit 22. In step S103, under control of the data extraction unit 23, the keyword model training apparatus 1 judges whether or not training data includes a preset keyword or an element of the keyword. In the case of judgment that the training data includes such a preset keyword or its element ("YES"), the processing proceeds to step S134. In the case of judgment that the training data does not include such a preset keyword or its element ("NO"), the processing proceeds to step S136.

Subsequently, in step S134, under control of the data extraction unit 23, the keyword model training apparatus 1 further judges whether or not the number of data pieces judged as including a specific keyword or its element is the upper limit or less. If the number of data pieces is judged as being the upper limit or less ("YES"), the processing proceeds to step S135. If the number of data pieces is judged as exceeding the upper limit ("NO"), the processing proceeds to step S136. In step S135, the data extraction unit 23 extracts the aforementioned data piece.

In more detail, the data extraction unit 23 extracts data pieces from training data in the case where the data number of data pieces including a specific keyword, a sub-word as part of the keyword, a syllable as part of the keyword, or a phoneme as part of the keyword is a predetermined data threshold or less. For example, assume that there are two keywords, "de n ki tsu ke te" and "ko n ni chi wa (hello)", and a threshold of the number of data pieces is 100. In this case, the data extraction unit 23 extracts 100 data pieces including "de n ki tsu ke te" and 100 data pieces including "ko n ni chi wa".

In step S136, under control of the data extraction unit 23, the keyword model training apparatus 1 judges whether or not all pieces of training data have been confirmed. In the case of judgment that all pieces of data have been confirmed (YES), the processing proceeds to step S137. In the case of judgment that not all pieces of data have been confirmed (NO), the processing returns to step S103 to continuously judge whether or not training data includes a keyword or its element.

In step S137, under control of the keyword model adaptation unit 24, the keyword model training apparatus 1 executes processing to adapt a trained generic model to a keyword model, using extracted data. Thereafter, the keyword model adaptation unit 24 stores the adapted keyword model in the keyword model storage unit 32. On a timely basis or in response to a request, the output control unit 25 is capable of reading and outputting information on the adapted keyword model.

As described above, in the fourth embodiment, the keyword model training apparatus 1 sets the upper limit to the number of data pieces extracted from training data. This reduces variation in the number of data pieces extracted from training data.

If the number of extracted data pieces varies depending on a keyword, a keyword model adapted using such data pieces has a risk of decreasing the performance for detecting some keywords. For example, in the example described above, assume that the number of data pieces including "de n ki tsu ke te" is 100, and the number of data pieces including "ko n ni chi wa" is 900. Assume that all of the data pieces including "de n ki tsu ke te" and the data pieces including "ko n ni chi wa" are extracted and the keyword model adaptation unit 24 performs adaptation to a keyword model using these data pieces. In this case, the number of data pieces including "ko n ni chi wa" is 9 times more than the number of data pieces including "de n ki tsu ke te". This results in a decreased performance of detecting "de n ki tsu ke te" even if the performance for detecting "ko n ni chi wa" is good.

According to the fourth embodiment, 100 pieces of data including "de n ki tsu ke te" and 100 data pieces including "ko n ni chi wa" are extracted. Thus, the number of data pieces including two keywords can be extracted in a balanced manner while preventing the performance of detecting some keywords from decreasing.

Fifth Embodiment

The keyword model training apparatus 1 as the information processing apparatus according to the fifth embodiment performs data extraction using both of the proportion threshold described in the third embodiment and the threshold of the number of data pieces described in the fourth embodiment.

The keyword model training apparatus 1 according to the fifth embodiment may have a system configuration and a functional configuration that are similar to those of the keyword model training apparatus 1 according to the first embodiment shown in FIGS. 1 and 2.

FIG. 8 shows a processing content and a processing procedure of the keyword model training apparatus 1 according to the fifth embodiment. In FIG. 8, the same processing as that of the first embodiment shown in FIG. 3 is assigned with the same numeral, and a detailed description for such processing is omitted.

In step S101, as in the first embodiment, the keyword model training apparatus 1 acquires training data under control of the training data acquisition unit 21. In step S102, the keyword model training apparatus 1 trains a generic model using the aforementioned training data under control of the model training unit 22. In step S103, under control of the data extraction unit 23, the keyword model training apparatus 1 judges whether or not training data includes a preset keyword or an element of the keyword. In the case of judgment that the training data includes such a preset keyword or its element ("YES"), the processing proceeds to step S144. In the case of judgment that the training data does not include such a preset keyword or its element ("NO"), the processing proceeds to step S147.

Subsequently, in step S144, under control of the data extraction unit 23, the keyword model training apparatus 1 further judges whether or not the number of data pieces judged as including a keyword or its element is a predetermined upper limit or not. In the case of judgment that the number of data pieces is the upper limit or less ("YES"), the processing proceeds to step S145. In the case of judgment that the number of data pieces exceeds the upper limit ("NO"), the processing proceeds to step S146.

In step S145, the data extraction unit 23 extracts a data piece judged in step S103 as including a keyword or its element.

On the other hand, regarding a data piece judged in step S103 as including a keyword or its element, the data extraction unit 23 calculates in step S146, the proportion in number of keywords or its elements to the data piece in a manner described in the third embodiment, and extracts data pieces in descending order according to the calculated proportion until the number of extracted data pieces reaches the upper limit. In this time, the data extraction unit 23 may extract data pieces using the proportion threshold described in the third embodiment.

In more detail, the data extraction unit 23 calculates the proportion in number of letters of a keyword or letters of a sub-word, syllables, or phonemes as part of the keyword to letters, syllables, or phonemes of a data piece as a judgment target, and extracts data pieces in descending order according to the proportion until the number of extracted data pieces reaches the threshold of the number of data pieces. Alternatively, the data extraction unit 23 may calculate the proportion in number of letters of a keyword or letters of a sub-word, syllables, or phonemes as part of the keyword to letters, syllables, or phonemes of a data piece as a judgment target, and extract only data pieces whose calculated proportion is equal to or more than a predetermined proportion threshold, in descending order according to the proportion until the number of extracted data pieces reaches the threshold of the number of data pieces.

For example, assume that extraction using a keyword is performed under the condition that a proportion threshold is set to 0.5 and a threshold of the number of data pieces is set to 100. Under the condition that a keyword is set to "de n ki tsu ke te", if the proportion of the number of letters of the keyword to the number of letters of a target data piece is 0.5 or more, and the number of data pieces including the utterance of "de n ki tsu ke te" is 100 or less, the data extraction unit 23 extracts those data pieces from training data. In the case of 100 or more data pieces each of which has the proportion of 0.5 or more of the number of letters of a keyword, the data extraction unit 23 extracts up to 100 data pieces in descending order according to the proportion.

The above manner for extraction using a keyword applies to extraction using a sub-word, a syllable, or a phoneme.

In step S147, under control of the data extraction unit 23, the keyword model training apparatus 1 judges whether or not all pieces of training data have been confirmed. In the case of judgment that all pieces of data have been confirmed (YES), the processing proceeds to step S148. In the case of judgment that not all pieces of data have been confirmed (NO), the processing returns to step S103 to continuously judge whether or not training data includes a keyword or its element.

In step S148, under control of the keyword model adaptation unit 24, the keyword model training apparatus 1 executes processing to adapt a trained generic model to a keyword model, using an extracted data piece. Thereafter, the keyword model adaptation unit 24 stores the adapted keyword model in the keyword model storage unit 32. On a timely basis or in response to a request, the output control unit 25 is capable of reading and outputting information on the adapted keyword model.

As described above, in the fifth embodiment, the keyword model training apparatus 1 sets the upper limit to the number of data pieces extracted from training data, and extracts, if the number of data pieces exceeds the upper limit, data pieces in descending order according to the proportion of a keyword or its element to a data piece. At this time, the keyword model training apparatus 1 may extract only data pieces that exhibit the proportion over a predetermined value.

According to the fifth embodiment, as described above, the keyword model training apparatus 1 extracts data pieces each of which has a high proportion of a keyword or its element while preventing the number of extracted data pieces from varying depending on a keyword. This enables efficient adaptation to a keyword model while preventing decrease in the performance of detecting some keywords.

Sixth Embodiment

The keyword model training apparatus 1 as the information processing apparatus according to the sixth embodiment further includes a keyword setting unit 27 that receives setting of a keyword from a user.

The keyword model training apparatus 1 according to the sixth embodiment may have a similar system configuration to that of the keyword model training apparatus 1 according to the first embodiment.

Figure 9:
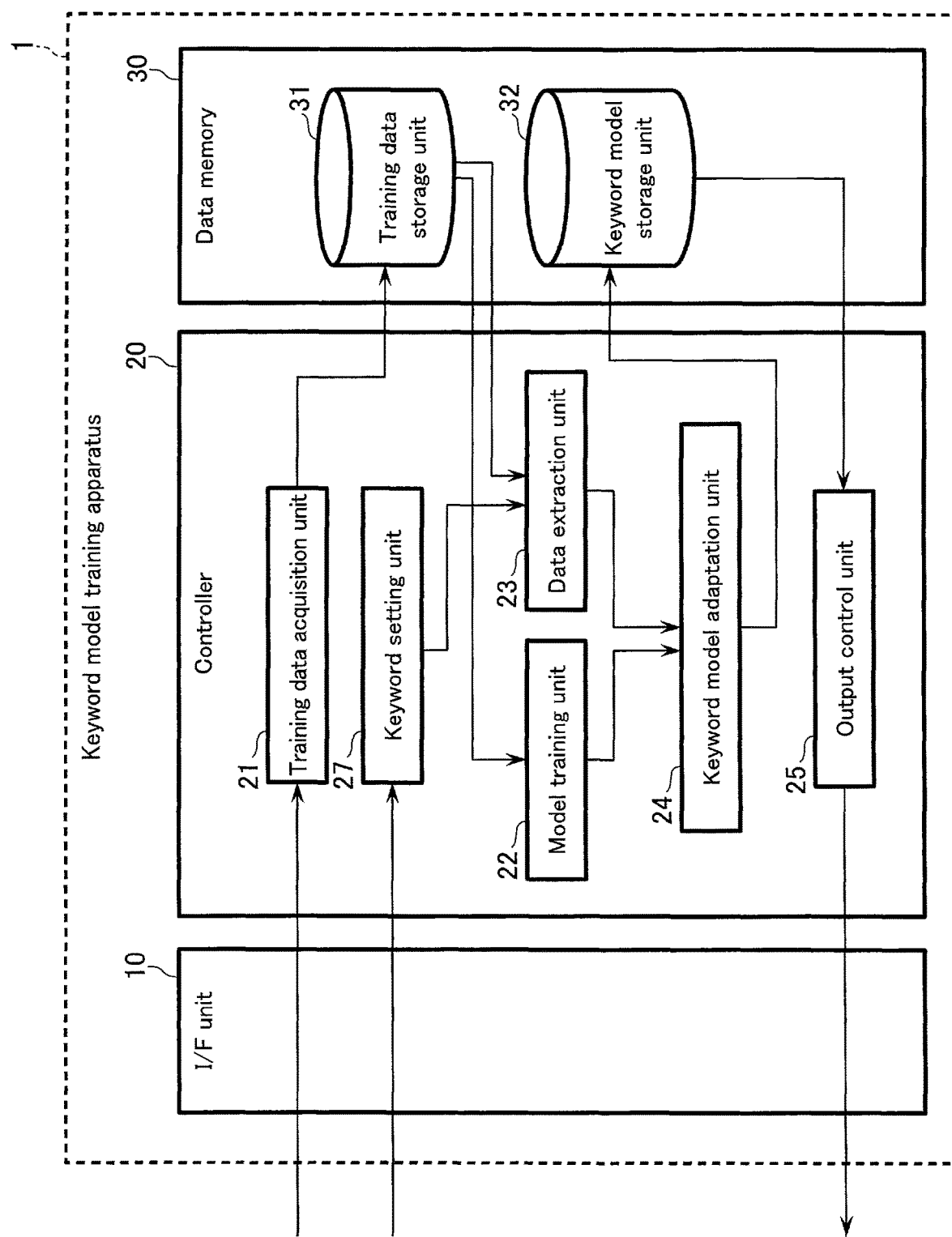
FIG. 9 is a block diagram showing an example of a function configuration of an information processing apparatus according to a sixth embodiment.

FIG. 9 is a block diagram showing a function configuration of the keyword detecting apparatus 1 according to the sixth embodiment. In FIG. 9, the same structures as those of the keyword model training apparatus 1 according to the first embodiment shown in FIG. 2 are assigned with the same numerals, and a detailed description of such structures is omitted As shown in FIG. 9, the keyword model training apparatus 1 according to the sixth embodiment includes the keyword setting unit 27 in addition to the training data acquisition unit 21, the model training unit 22, the data extraction unit 23, the keyword model adaptation unit 24, the output control unit 25, the training data storage unit 31, and the keyword model storage unit 32.

The keyword setting unit 27 receives a keyword set by a user via the I/F unit 10 and passes it to the data extraction unit 23.

The keyword model training apparatus 1 according to the sixth embodiment may employ the same processing flow as that of the first embodiment shown in FIG. 3.

First, in step S101, the keyword model training apparatus 1 according to the sixth embodiment acquires training data under control of the training data acquisition unit 21. In step S102, the keyword model training apparatus 1 trains a generic model using the aforementioned training data under control of the model training unit 22.

The keyword setting unit 27 may execute the processing to receive a keyword set by a user and pass it to the data extraction unit 23 at a given timing. The above processing may be executed before step S101 or right before step S103.

In step S103, under control of the data extraction unit 23, the keyword model training apparatus 1 judges based on a keyword that is designated by a user and is received from the keyword setting unit 27, whether or not the training data includes the keyword or its element. In the case of judgment that the training data includes the keyword or its element ("YES"), the processing proceeds to step S104. In the case of judgment that the training data does not include the keyword or its element ("NO"), the processing proceeds to step S105. In step S104, the data extraction unit 23 extracts the aforementioned data piece. In step S105, the data extraction unit 23 judges whether or not all pieces of training data have been confirmed. In the case of judgment that all pieces of data have been confirmed (YES), the processing proceeds to step S106. In the case of judgment that not all pieces of data have been confirmed (NO), the processing returns to step S103 to continuously judge whether or not training data includes a keyword or its element. In step S106, under control of the keyword model adaptation unit 24, the keyword model training apparatus 1 executes processing to adapt a trained generic model to a keyword model, using extracted data.

In more detail, for example, when a user inputs "de n ki tsu ke te" as a keyword via the input device 3 such as a keyboard, the keyword setting unit 27 receives this input, sets "de n ki tsu ke te" as a keyword, and passes this keyword to the data extraction unit 23. The data extraction unit 23 extracts from training data, a data piece that includes the aforementioned keyword, a sub-word as part of the keyword, a syllable as part of the keyword, or a phoneme as part of the keyword. The keyword model adaptation unit 24 adapts a trained generic model to a keyword model using data including at least an extracted data piece. The adapted keyword model serves as a keyword model for "de n ki tsu ke te". Thereafter, the keyword model adaptation unit 24 stores the adapted keyword model in the keyword model storage unit 32. On a timely basis or in response to a request, the output control unit 25 is capable of reading and outputting information on the adapted keyword model.

As described above, in the sixth embodiment, the keyword model training apparatus 1 extracts data pieces from training data based on a keyword set by a user at his or her will, and adapts a trained generic model to a keyword model for detection of the keyword set by the user.

As described above, according to the sixth embodiment, adaptation to a keyword model can be performed without the need of newly recording utterance data for a keyword set by the user.

Seventh Embodiment

The seventh embodiment relates to a keyword detecting apparatus configured to perform keyword detection using a keyword model adapted in accordance with the above embodiments.

FIG. 10 shows a system configuration and a function configuration of a keyword detecting apparatus 100 according to the seventh embodiment.

The keyword detecting apparatus 100 includes, as hardware, an I/F unit 110, a controller 120, and a data memory 130.

The I/F unit 110 may include a communication interface. The communication interface includes, for example, more than one wired or wireless communication interface, and enables transmission and reception of information between the keyword detecting apparatus 100 and an external device. For example, a wired LAN is used as the wired interface, and an interface that adopts a low power radio data communication standard such as a wireless LAN or Bluetooth (registered trademark) is used as the wireless interface.

A microphone 101, an input device 102, and an output device 103 may be connected to the I/F unit 110. For example, the I/F unit 110 functions to capture voice collected by the microphone 101, as a voice signal, and pass the voice signal to the controller 120. The I/F unit 110 functions to capture data input via the input device 102 such as a keyboard, a touch-pad, a mouse, etc., and pass the data to the controller 120. The I/F unit 110 further functions to output data output from the controller 120 to the output device 4 that includes a display device using, e.g., liquid crystal or organic Electro Luminescence (EL), a speaker configured to output voice, etc. The devices used as the microphone 101, the input device 102, and the output device 103 may be those built into the keyword detecting apparatus 100, or may be those of another information terminal that is communicable via a network.

The controller 120 includes a hardware processor such as a CPU, and a program memory. Used as the program memory is, for example, a combination of a non-volatile memory such as an HDD or SSD and a non-volatile memory such as a ROM. The program memory stores therein a program necessary for execution of various types of control processing according to the embodiment.

Used as the data memory 130 is, for example, a combination of a non-volatile memory such as an HDD or SSD and a non-volatile memory such as a RAM. The data memory 130 is used to store various types of data that is acquired or generated during the process of information processing.

The data memory 130 has a storage area provided with the keyword model storage unit 131. The keyword model storage unit 131 is used to store a keyword model adapted by the keyword model training apparatus 1 according to the above embodiments. The keyword detecting apparatus 100 and the keyword model training apparatus 1 may be formed as an integrated apparatus or separate apparatuses. Similarly, the keyword model storage unit 131 included in the keyword detecting apparatus 100 may be identical to or different from the keyword model storage unit 32 included in the keyword model training apparatus 1.

The controller 120 includes the hardware processor and the program memory as described above, and further includes, as processing function units, a voice acquisition unit 121 and a keyword detecting unit 122. Each of those processing function units is realized by causing the aforementioned hardware processor to execute a program stored in the program memory. The controller 120 may be realized in other various forms including an integrated circuit such as ASIC, FPGA, etc. The aforementioned program may be provided via a network.

The voice acquisition unit 121 acquires a voice signal of voice collected by the microphone 101, via the I/F unit 110. The voice acquisition unit 121 further executes processing to extract a voice feature quantity from the acquired voice data, and pass it to the keyword detecting unit 122.

The keyword detecting unit 122 reads a keyword model from the keyword model storage unit 131 and performs keyword detection using a voice feature quantity received from the voice acquisition unit 121. The keyword detecting unit 122 is further capable of outputting a detection result via the I/F unit 110.

FIG. 11 is a flowchart showing a processing procedure and content of processing carried out by the keyword detecting apparatus 100 according to the seventh embodiment.

The keyword detecting apparatus 100 monitors the presence or absence of a user's utterance based on a signal from the microphone 101, and upon detection of such an utterance, initiates the processing described below.

First, in step S201, the keyword detecting apparatus 100 acquires voice data including a plurality of frames under control of the voice acquisition unit 121. The voice acquisition unit 121 retrieves a voice waveform (voice data) of utterance obtained by the microphone 101 collecting voice, via the I/F unit 110.

Next, in step S202, the keyword detecting apparatus 100 extracts a voice feature quantity under control of the voice acquisition unit 121. For example, the voice acquisition unit 121 samples at 16 kHz, an analog spectrum of the voice waveform received from the microphone 101, cuts out a digital spectrum at certain intervals, and extracts and outputs a voice feature quantity (36-dimension of an MFCC feature quantity) as in the first embodiment.

In step S203, the keyword detecting apparatus 100 reads a keyword model from the keyword model storage unit 131 under control of the keyword detecting unit 122. For example, in the case where a keyword is set to "de n ki tsu ke te", a keyword model for "de n ki tsu ke te", which is adapted according to the first embodiment, the second embodiment, the third embodiment, the fourth embodiment, the fifth embodiment, or the sixth embodiment, is to be read.

In step S204, the keyword detecting apparatus 100 detects a keyword by inputting the aforementioned feature quantity to the read keyword model under control of the keyword detecting unit 122. Keyword detection may employ various methods including, for example, a method of calculating a keyword score by comparing a feature quantity of input voice with a keyword model. If a keyword score is a predetermined threshold or more, "de n ki tsu ke te" is detected as a keyword (see, for example, Jpn. Pat. Appln. KOKAI Publication No. 2018-155957).

In step S205, the keyword detecting apparatus 100 outputs a detection result to the output device 103 under control of the keyword detecting unit 122. The keyword detecting apparatus 100 may output information indicative of "de n ki tsu ke te" only when a keyword is detected. When a keyword is not detected, the keyword detecting apparatus 100 may output an indication of this fact.

According to the seventh embodiment, as described above, adaptation to a keyword model is performed according to the first embodiment, the second embodiment, the third embodiment, the fourth embodiment, the fifth embodiment, or the sixth embodiment. Keyword detection is performed using an adapted keyword model.

According to the seventh embodiment, as described above, accurate keyword detection can be performed using an adapted keyword model without the use of keyword utterance data obtained from a large number of speakers.

Experimental Result

Figure 12:
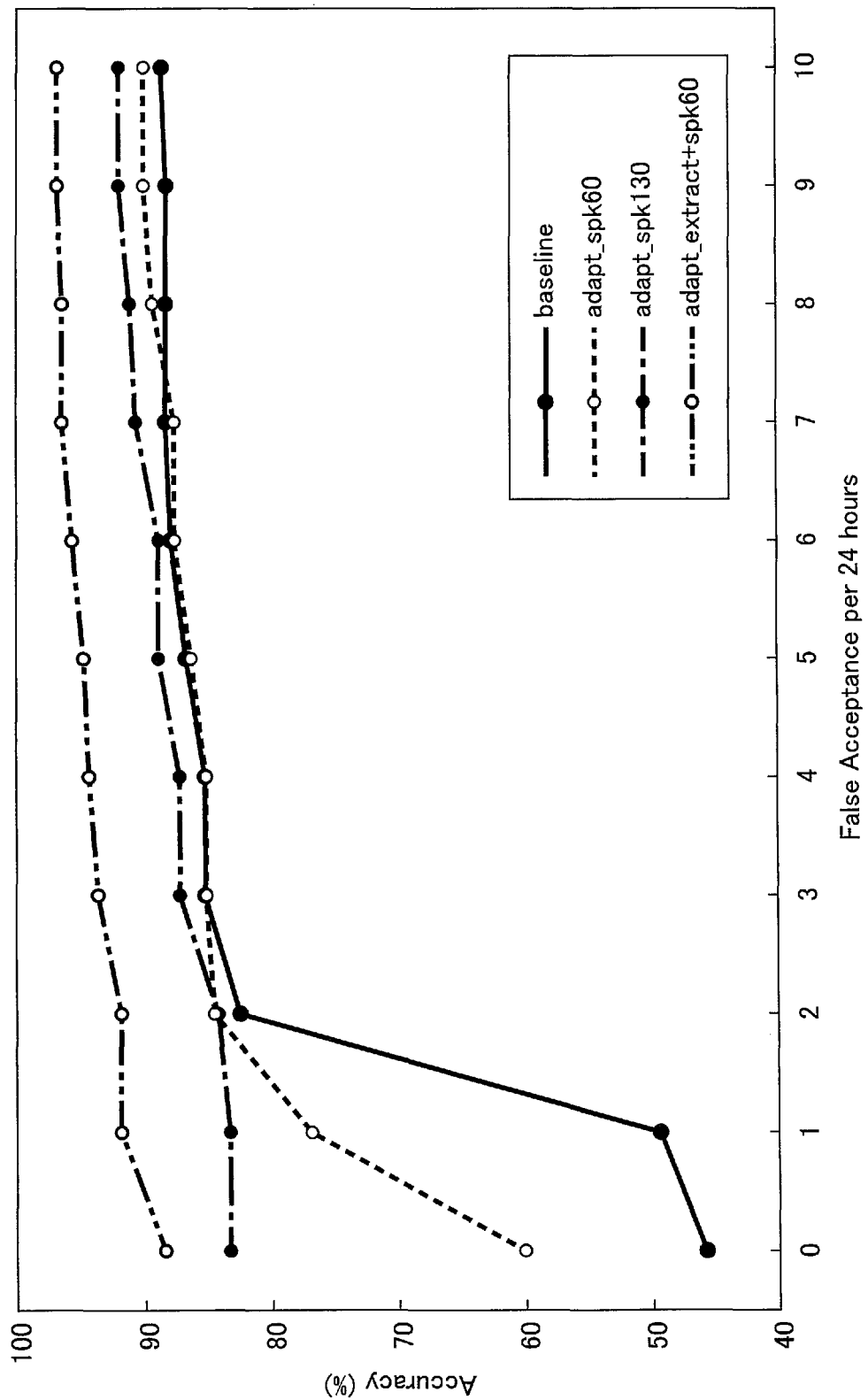
FIG. 12 is a graph showing a result of an experiment using a keyword detecting model adapted by an embodiment.

FIG. 12 shows an example of an experimental result using a keyword model adapted using the embodiments described above. As described above, a keyword score was used for keyword detection. That is, a keyword score is calculated from voice and compared with a preset threshold. If the keyword score is the threshold or more, it is judged that an utterance concerned is a keyword. If not, it is judged that an utterance concerned is not a keyword.

In FIG. 12, the vertical axis represents the accuracy (%), and a larger value means a higher accuracy. Herein, the accuracy represents how many times correct detection is made with respect to 100 utterances of a keyword (for example, "de n ki tsu ke to").

The horizontal axis represents a false acceptance per 24 hours. Herein, the false acceptance represents the number of times an utterance which is not a keyword is detected as a keyword by mistake. On the horizontal axis, false acceptance such as "0" and "1" means that false acceptance is low because a threshold of the keyword score is strictly set. In this case, voice may not be detected (tends to be rejected) even when it is actually a keyword. On the horizontal axis, false acceptance such as "10" means that a keyword is easily recognized because a threshold is set loosely; however, there is a risk that a non-keyword whose score is a threshold or more is accepted by mistake.

"Baseline" represents an example using a generic model. According to the generic model, the accuracy was extremely low in the case of false acceptance being "0" and "1".

"Adapt_spk60" represents an example in which adaptation was made by using keyword utterance data obtained from 60 speakers for adaptation (for example, data obtained by 60 persons uttering "de n ki tsu ke to") without performing data extraction. This example was slightly improved in accuracy as compared with the generic model.

"Adapt_spk130" represents an example in which adaptation was made by using keyword utterance data by 130 speakers for adaptation without performing data extraction. This example was slightly improved in accuracy as compared with the example case using utterance data obtained from 60 speakers.

"Adapt_extract+spk60" represents an example in which adaptation was made by performing data extraction according to the above embodiments in addition to the use of keyword utterance data obtained from 60 speakers. The extremely high accuracy was achieved in any of the cases of false acceptance being "0" to "10". In particular, it is understood that these cases achieved higher accuracy than the case of using utterance data obtained from 130 speakers.

According to the information processing apparatus, the keyword detecting apparatus and the information processing method of at least one embodiment described above, it is possible to provide a technique by which a keyword model can be trained efficiently using a limited volume of data.

Other Embodiments

The present invention is not limited to the foregoing embodiments.

For example, respective function units included in the keyword model training apparatus 1 described in the foregoing embodiments may be dispersed throughout a plurality of apparatuses (such as a server, an edge server, other client terminals, etc.) so that processing is performed by these apparatuses cooperating with each other. Respective function units may be realized through the use of a circuit. A circuit may be an exclusive circuit for realizing a particular function or may be a general circuit such as a processor.

Regarding each processing flow described in the above, the step order is not limited to the descried order. The order of some steps may be shuffled or concurrently executed. A series of processing described above is not necessarily executed in a temporally continuous manner. Each step may be executed at a given timing.

For example, in the processing flow described referring to FIGS. 3, 5, 6, 7, and 8, the processing of training a general-purpose model and the processing of extraction from training data are not necessarily executed in series. These training processing and extraction processing may be executed in parallel.

Alternatively, after training a general-purpose model, the model training unit 22 may temporarily store the trained general-purpose model into a general-purpose model storage unit (not shown) provided in a storage area. Similarly, after extracting a data piece from data, the data extraction unit 23 may temporarily store the extracted data piece into an extracted data storage unit (not shown) provided in a storage area. This enables, under control of the keyword model adaptation unit 24, the keyword model training apparatus 1 to execute processing to read a trained general-purpose model and an extracted data piece from respective storage units and perform adaptation to a keyword model at a given timing.

At least part of the processing described in each of the above embodiments can be realized by using, for example, a processor mounted on a general computer, as basic hardware. As a way of providing a program for realizing the processing described above, such a program may be stored in a computer-readable recording medium (storage medium). A program is recorded in a recording medium, as a file in an installable form or an executable form. Examples of a recording medium include a magnetic disc, an optical disk (CD-ROM, CD-R, DVD, etc.), a magneto-optical (MO, etc.) disk, a semiconductor memory, etc. Any recording medium is usable as long as it can record a program and is computer-readable. A program for realizing the processing described above may be stored on a computer (server) connected to a network such as the Internet, and be downloaded to a computer (client) via a network.

Other than the above, such as acquisition of voice data, generation of a model, etc., various modifications may be carried out without departing from the spirit of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a processor configured to operate as:
a first data acquisition unit configured to acquire first training data including at least one combination of a voice feature quantity and a correct phoneme label of the voice feature quantity;
a training unit configured to train, using the first training data, an acoustic model in a manner to output the correct phoneme label in response to input of the voice feature quantity, the input being performed by the acoustic model, the acoustic model outputting the correct phoneme label;
an extraction unit configured to extract, from the first training data, second training data including voice feature quantities of first data pieces and correct phoneme labels of the voice feature quantities, the first data pieces including a preset keyword and at least one of a sub-word included in the preset keyword, a syllable included in the preset keyword, or a phoneme included in the preset keyword; and
an adaptation processing unit configured to adapt, using the second training data, the trained acoustic model to a keyword model used for detection of the preset keyword, the keyword model being generated from the trained acoustic model, the keyword model adapted for the preset keyword being retrained based on the trained acoustic model, wherein
the extraction unit extracts second data pieces as the second training data up to a predetermined number of data pieces, in descending order according to a proportion in number of a letter of the preset keyword, a letter of the sub-word, the syllable, or the phoneme to a data piece.

2. The apparatus according to claim 1, wherein the processor is further configured to operate as a second data acquisition unit configured to acquire keyword utterance data including utterance voice of the preset keyword, wherein the adaptation processing unit adapts the acoustic model to the keyword model using the second training data and the keyword utterance data.

3. The apparatus according to claim 1, wherein the extraction unit extracts as the second training data, a second data piece in which the proportion in number of a letter of the preset keyword, the letter of the sub-word, the syllable, or the phoneme to the second data piece is a predetermined value or more.

4. The apparatus according to claim 1, wherein the extraction unit extracts the second training data up to the predetermined number of data pieces.

5. The apparatus according to claim 1, wherein the extraction unit extracts as the second training data, the second data pieces in each of which the proportion in number of a letter of the preset keyword, Hall the letter of the sub-word, the syllable, or the phoneme to a data piece is a predetermined value or more, up to the predetermined number of data pieces in descending order according to the proportion.

6. The apparatus according to claim 1, wherein the processor is further configured to operate as a keyword setting unit configured to receive setting of the preset keyword from a user.

7. A keyword detecting apparatus configured to perform keyword detection using a keyword model adapted by the apparatus according to claim 1.

8. An information processing method, performed by an information processing apparatus, the method comprising:
acquiring first training data, including at least one combination of a voice feature quantity and a correct phoneme label of the voice feature quantity;
training, using the first training data, an acoustic model in a manner to output the correct phoneme label in response to input of the voice feature quantity, the input being performed by the acoustic model, the acoustic model outputting the correct phoneme label;
extracting, from the first training data, second training data including voice feature quantities of data pieces and correcting phoneme labels of the voice feature quantities, the data pieces including a preset keyword and at least one of a sub-word included in the preset keyword, a syllable included in the preset keyword, or a phoneme included in the preset keyword; and
adapting the trained acoustic model using the second training data to a keyword model used for detection of the preset keyword, the keyword model being generated from the trained acoustic model, the keyword model adapted for the preset keyword being retrained based on the trained acoustic model, wherein
the extracting extracts second data pieces as the second training data up to a predetermined number of data pieces, in descending order according to a proportion in number of a letter of the preset keyword, a letter of the sub-word, the syllable, or the phoneme to a data piece.

9. A non-transitory computer readable medium including computer executable instructions, wherein the instructions, when executed by a processor, cause the processor to perform a method comprising:
acquiring first training data including at least one combination of a voice feature quantity and a correct phoneme label of the voice feature quantity;
training, using the first training data, an acoustic model in a manner to output the correct phoneme label in response to input of the voice feature quantity, the input being performed by the acoustic model, the acoustic model outputting the correct phoneme label;
extracting, from the first training data, second training data including voice feature quantities of data pieces and correcting phoneme labels of the voice feature quantities, the data pieces including a preset keyword and at least one of a sub-word included in the preset keyword, a syllable included in the preset keyword, or a phoneme included in the preset keyword; and
adapting the trained acoustic model using the second training data to a keyword model used for detection of the preset keyword, the keyword model being generated from the trained acoustic model, the keyword model adapted for the preset keyword being retrained based on the trained acoustic model, wherein
the extracting extracts second data pieces as the second training data up to a predetermined number of data pieces, in descending order according to a proportion in number of a letter of the preset keyword, a letter of the sub-word, the syllable, or the phoneme to a data piece.

* * * * *